US010023717B2

(12) United States Patent
Schuck et al.

(10) Patent No.: US 10,023,717 B2
(45) Date of Patent: Jul. 17, 2018

(54) THERMALLY-CONDUCTIVE SALT-CONTAINING PARTICLES OF CARBON BLACK AND METAL

(71) Applicant: PENN COLOR, INC., Doylestown, PA (US)

(72) Inventors: Ronald W. Schuck, Doylestown, PA (US); Charles B. Rybny, Doylestown, PA (US)

(73) Assignee: PENN COLOR, INC., Doylestown, PA (US)

( * ) Notice: Subject to any disclaimer, the term of this patent is extended or adjusted under 35 U.S.C. 154(b) by 358 days.

(21) Appl. No.: 14/638,822

(22) Filed: Mar. 4, 2015

(65) Prior Publication Data

US 2015/0252168 A1    Sep. 10, 2015

Related U.S. Application Data

(60) Provisional application No. 61/948,152, filed on Mar. 5, 2014.

(51) Int. Cl.
| | |
|---|---|
| *C08K 3/04* | (2006.01) |
| *C08K 3/08* | (2006.01) |
| *C08K 3/18* | (2006.01) |
| *C09C 1/48* | (2006.01) |

(52) U.S. Cl.
CPC ............. *C08K 3/08* (2013.01); *C08K 3/04* (2013.01); *C08K 3/18* (2013.01); *C09C 1/48* (2013.01); *C08K 2003/085* (2013.01); *C08K 2003/0806* (2013.01)

(58) Field of Classification Search
CPC ..................................... C08K 3/04; C08K 3/08
See application file for complete search history.

(56) References Cited

U.S. PATENT DOCUMENTS

| | | | | |
|---|---|---|---|---|
| 4,566,991 A | * | 1/1986 | Sibilia | ............... C08K 3/0033 252/512 |
| 6,326,599 B1 | | 12/2001 | Pickford | |
| 2006/0116443 A1 | | 6/2006 | Probst et al. | |
| 2006/0251953 A1 | | 11/2006 | Li et al. | |
| 2011/0040007 A1 | * | 2/2011 | Chandrasekhar | ........ H01B 1/22 524/404 |
| 2013/0183467 A1 | | 7/2013 | Thompson et al. | |

FOREIGN PATENT DOCUMENTS

| | | |
|---|---|---|
| EP | 1809690 B1 | 8/2008 |
| WO | 00/15547 A2 | 3/2000 |
| WO | 00/15547 A3 | 3/2000 |

* cited by examiner

*Primary Examiner* — Peter D. Mulcahy

(74) *Attorney, Agent, or Firm* — Stradley Ronon Stevens & Young, LLP

(57) ABSTRACT

A method of forming a salt-containing carbon-metal particle, the method including forming an aqueous mixture of acidic carbon black and one or more metals and applying energy to the aqueous mixture, whereby applying energy to the aqueous mixture results in the metal chemisorbing to the acidic carbon black. The aqueous mixture may be prepared by preparing an aqueous dispersion of the acidic carbon black and adding metal particles in a zero oxidation state to the aqueous dispersion of the acidic carbon black; or dissolving a metal in a zero oxidation state in an acidic aqueous solution, preparing an aqueous dispersion of the acidic carbon black, and adding the aqueous dispersion of the acidic carbon black to the acidic aqueous solution of the dissolved metal. The acidic carbon black may be oxidized carbon black, and the metal may be zinc, aluminum, gold, iron, lead, silver, copper, or combinations thereof.

6 Claims, No Drawings

THERMALLY-CONDUCTIVE SALT-CONTAINING PARTICLES OF CARBON BLACK AND METAL

RELATED APPLICATION

This application claims the benefit of priority under 35 U.S.C. § 119(e) to earlier filed U.S. provisional patent application Ser. No. 61/948,152, filed on Mar. 5, 2014, the disclosure of which is incorporated herein by reference in its entirety.

TECHNICAL FIELD

The present invention relates generally to thermally-conductive salt-containing particles of carbon black and one or more metals, and particularly to the use of thermally-conductive salt-containing particles of carbon black and one or more metals as plastic additives.

BACKGROUND

It is often desirable to modify the thermal properties of plastics, such that the resultant plastic is more suitable for certain applications that include thermal stresses. Such additives may have uses in industries where it is desirable to have plastic materials with greater thermal conductivity, such as plastic components for solar and geothermal energy systems, plastic automotive parts, and high heat output lighting system components. Thermally conductive materials may also be used in non-thermoplastic technologies such as coatings for automotive and industrial applications as well as in electrical storage systems where thermal management is a consideration.

One example application is improving the thermal conductivity of plastics used as coverings for automotive headlights. Due to their intense brightness, the bulbs used in automotive headlights can generate large amounts of heat which could damage surrounding components. By increasing the thermal conductivity of the plastic covering, the plastic is better able to dissipate the heat generated by the headlight.

Another example application is blow molding, a typical manufacturing process by which hollow plastic parts, such as bottles and other containers, are formed. In blow molding, a plastic parison or preform is heated until softened. Once softened, air is blown into the parison or preform to push the plastic against a mold. Once the plastic has cooled, the mold is opened and the plastic part is removed. Typical plastics used for food packaging include polypropylene and polyethylene terephthalate (collectively, "the plastics"). Due to the relatively poor ability of the plastics to absorb infrared radiation, the process of heating the plastic typically limits the rate at which a blow molding process can produce bottles. Heating the plastics to the desired temperature also requires large amounts of energy, increasing the cost of the manufacturing process. Accordingly, it is common to add additives to the plastic resins in order to include the rate at improve the heat-up rate.

Common additives include finely dispersed inert black materials, such as carbon black having a mean particle diameter of at least 200 nanometers (nm) as disclosed by European Patent No. 1,809,690 to Harrison et al., that absorb the energy emitted by infrared energy sources used in blow molding machines. Carbon black is a form of paracrystalline carbon typically produced by the incomplete combustion of heavy petroleum products. However, a need still exists for additives that improve the thermal properties of plastics beyond the capabilities of known additives such as carbon black.

SUMMARY

According to one embodiment of the present invention, a salt-containing carbon-metal particle is formed by forming an aqueous mixture of acidic carbon black and one or more metals, and applying energy to the aqueous mixture. Applying energy to the aqueous mixture results in the metal chemisorbing to the acidic carbon black. The aqueous mixture may be prepared by preparing an aqueous dispersion of the acidic carbon black and adding metal particles in a zero oxidation state to the aqueous dispersion of the acidic carbon black; or dissolving a metal in a zero oxidation state in an acidic aqueous solution, preparing an aqueous dispersion of the acidic carbon black, and adding the aqueous dispersion of the acidic carbon black to the acidic aqueous solution of the dissolved metal. The acidic carbon black may be oxidized carbon black, and the metal may be zinc, aluminum, gold, iron, lead, silver, copper, or combinations thereof.

According to another embodiment, a salt-containing carbon-metal particle is provided which is produced by the process of forming an aqueous mixture of acidic carbon black and one or more metals; and applying energy to the aqueous mixture, whereby applying energy to the aqueous mixture results in the metal chemisorbing to the acidic carbon black. The aqueous mixture may be prepared by preparing an aqueous dispersion of the acidic carbon black and adding metal particles in a zero oxidation state to the aqueous dispersion of the acidic carbon black; or dissolving a metal in a zero oxidation state in an acidic aqueous solution, preparing an aqueous dispersion of the acidic carbon black, and adding the aqueous dispersion of the acidic carbon black to the acidic aqueous solution of the dissolved metal. The acidic carbon black may be oxidized carbon black, and the metal may be zinc, aluminum, gold, iron, lead, silver, copper, or combinations thereof.

According to another embodiment, heat dissipation of a plastic component may be improved by adding to the plastic an additive including a salt-containing carbon-metal particle, where the salt-containing carbon-metal particle includes carbon black and a metal, and the carbon-metal salt additive increases the heat capacity of the plastic. The salt-containing carbon-metal particle may be added to the plastic in a concentration ranging from approximately 0.01 wt. % to approximately 5.0 wt. %. The metal may be zinc, aluminum, gold, iron, lead, silver, copper, or combinations thereof.

DETAILED DESCRIPTION

Embodiments of the present invention include thermally-conductive salt-containing particles of carbon black and one or more metals, as well as methods of producing the salt-containing carbon-metal particles. The salt-containing carbon-metal particles maybe used as additives in plastic resins (e.g., polypropylene or polyethylene terephthalate (PET)) to improve the thermal properties of the plastic.

Carbon black is a paracrystalline form of carbon typically produced by the incomplete combustion of heavy petroleum products. While carbon black is known to have good thermal capacity, it is also an insulator with poor thermal conductivity. Thermal conductivity is a measure of the ease with which temperature is transmitted through a material. Materials with high thermal conductivity are typically called conductors and those with low conductivity are typically called insulators. Solid conductors such as metals typically have thermal conductivities in the range of approximately 10 W m$^{-1}$ °C.$^{-1}$ to approximately 400 W m$^{-1}$ °C.$^{-1}$ and insulators such as polymers, glasses, and ceramics have thermal conductivities in the range of approximately 0.2 W m$^{-1}$ °C.$^{-1}$ to approximately 2 W m$^{-1}$ °C.$^{-1}$. Thermal conductivity changes as a weak function of temperature and rarely changes by a factor of ten within a general class of materials. Determination of a material's thermal conductivity is important in evaluating its utility for specific applications.

The salt-containing carbon-metal particles according to embodiments of the present invention provide for materials that maintain or improve the heat capacity of non-metallic carbon black while greatly improving the thermal conductivity. Accordingly, the salt-containing carbon-metal particles provide a suitable additive that will increase both the thermal conductivity and thermal capacity of any material into which it is incorporated, particularly relative to non-metallic carbon black at similar concentrations.

In one embodiment, the salt-containing carbon-metal particle includes approximately 50 wt. % to approximately 90 wt. % of carbon and approximately 10 wt. % to approximately 50 wt. % of metal. The ratio of the metal to the carbon black may be approximately 1:1 to approximately 1:9. In one embodiment, the particles have a size ranging from approximately 12 nm to approximately 400 nm. However, it will be understood that the sizes of the salt-containing carbon-metal particles are not limited to this range. For many applications, smaller particles may be preferable and the salt-containing carbon-metal particles may be nanoscale (i.e., having a size less than about 100 nm).

The salt-containing carbon-metal particles may formed by first preparing an aqueous mixture of acidic carbon black and one or more metals and then applying energy to the solution resulting in the salt-containing carbon-metal particles precipitating from the mixture. In one embodiment, the mixture includes approximately 50 wt. % to approximately 90 wt. % of carbon black and approximately 10 wt. % to approximately 50 wt. % of the metal.

Any acidic pigmentary carbon black may be used to form the mixture. The carbon black may be formed using any suitable process, including, but not limited to, lamp, furnace, channel, thermal, acetylene, gasification, and plasma. The carbon black preferably has a primary particle size of approximately 8 nm to approximately 150 nm. In one embodiment, the acidic carbon black may include oxidized carbon black. Exemplary oxidized carbon blacks may include up to about 15 wt. % oxygen, but embodiments of the present invention may include use of oxidized carbon blacks with greater oxygen concentrations. In some embodiments, a neutral carbon black may be pretreated with an acid such as hydrochloric acid to obtain the acidic carbon black.

Suitable metals include, but are not limited to, zinc, aluminum, gold, iron, lead, silver and copper. It is preferable that the metal is not easily oxidized, as oxidation would greatly reduce the thermal conductivity of the salt-containing carbon-metal particle over time. Accordingly, silver and copper are most preferred.

The mixture of acidic carbon black and metal may be prepared according to at least two different methods. In a first embodiment, an aqueous dispersion of the acidic carbon black is prepared. The aqueous dispersion of acidic carbon black may be formed by any dispersion techniques known to one in the art capable of separating pigment aggregates to their primary aggregate size, including sonication, milling, and shearing. The pH of the dispersion is preferably less than approximately 4, and more preferably less than approximately 2. As previously mentioned, an acid such as hydrochloric acid. may be added to a dispersion of a neutral carbon black to acidify the neutral carbon black and obtain the dispersion of acidic carbon black. Acid may be further added to a dispersion of an acidic carbon black such as oxidized carbon black to further reduce the pH to the desired level. A surfactant such as polysorbate may also be added to the solution to stabilize the dispersion and prevent flocculation of the acidic carbon black particles. The mixture is then prepared by adding particles of pulverized metal in a zero oxidation state to the aqueous dispersion of acidic carbon black. The pulverized metal may have a particle size of approximately 250 nm. In other embodiments, the pulverized metal may include nanoparticles having a particle size of about 1 nm to about 100 nm. However, embodiments are not limited to metal particles of any particular size.

In a second embodiment, the metal in a zero oxidation state is added to an aqueous solution. An acid such as hydrochloric acid is added to reduce the pH to the desired level and solubilize the metal. The pH of the metal solution is preferably less than approximately 4, and more preferably less than approximately 2. The mixture is then formed by adding acidic carbon black, such as oxidized carbon black, to the metal solution. The acidic carbon black may be dispersed throughout the metal solution by any dispersion techniques known to one in the art capable of separating pigment aggregates to their primary aggregate size, including sonication, milling, agitating, and shearing. A surfactant such as polysorbate may also be added to the mixture to prevent flocculation of the acidic carbon black particles.

Energy is then added to the mixture to cause the precipitation of the salt-containing carbon-metal particles from the aqueous mixture. In some embodiments, energy may be added through heating the mixture, sonicating the mixture, microwaving the mixture, agitating or shearing the mixture, or any combination thereof. In embodiments where the mixture is formed by dispersing the acidic carbon black in a metal solution, the same process may be used to add energy to the mixture and to disperse the acidic carbon black in the metal solution. In a preferred embodiment, energy is added to the mixture through a combination of heating and sonicating. For example, the mixture may be heated to a temperature of approximately 50° C. to approximately 95° C. and subjected to ultrasonication at 100% intensity and about 1200 watts for a period of approximately 0.5 minutes to approximately 5.0 minutes. In another exemplary embodiment, the mixture may be microwaved at a power of approximately 300 watts for a period of approximately 0.5 minutes to approximately 5.0 minutes. Once the salt-containing carbon-metal particles form in the mixture, the material may be filtered, washed, and dried to obtain the particles from the mixture.

Without being bound to a particular theory, it is believed that the salt-containing carbon-metal particles are formed by at least a portion of the metal forming a loosely-associated ionic bond with the surface of the acidic carbon black particle whereupon the metal chemisorbs to the acidic carbon black. At the interface between the metal and the carbon, a metal atom exchanges with a cation, such as a hydrogen atom, of the acidic carbon black, such that the surface of the acidic carbon black particle includes a carbon-metal salt. As used herein "salt-containing" refers to this exchange of a cation and metal anion at the interface of between the acidic carbon-metal particle and the metal. It will be understood that the carbon and the metal may react only at the surface of the carbon black particle, such that less than 100% of the carbon contained by the carbon black particle is reacted. The bond between the carbon and the metal is strong enough that the individual components (i.e., the metal and the carbon black) cannot be separated once the particles are formed. In contrast, testing of carbon blacks with neutral pHs under similar conditions led to particles that separated back into distinct carbon and metal particles under centrifuge. It is not believed that metal carbonates are being formed the material does not change color from black (i.e., the color of carbon black) to the associated color of the corresponding metallic carbonate (e.g., blue-green for copper carbonate).

Further embodiments of the present invention include methods of using the salt-containing carbon-metal particles to improve the heat dissipation of component made from a plastic composition by adding the salt-containing carbon-metal particle to the plastic composition. The one or more of the salt-containing carbon-metal particles may be added to the composition in a concentration ranging from approximately 0.01 wt. % to approximately 5.0 wt. %.

In one example, the component is a plastic cover for an automotive headlight. By increasing the overall heat capacity of the plastic, the plastic cover is better able to dissipate heat generated by the headlight. By better dissipating heat, the improved headlight covers would reduce the risk of heat damage to the surrounding components, allow for brighter (and accordingly hotter) bulbs to be used, or both.

In another embodiment, the salt-containing carbon-metal particles may be used as a reheat additive for blow molded plastic bottles. The plastic bottle may be formed from a composition including one or more polymers blended with one or more of the salt-containing carbon-metal particles prepared according the above description. The composition may further include any number of other known additives, such as dyes or oxygen scavengers. Other suitable additives include toners, pigments, glass fibers, fillers, impact modifiers, antioxidants, stabilizers, flame retardants, reheat aides, acetaldehyde-reducing compounds, oxygen scavengers, and barrier enhancing aides.

The one or more polymers may include, but are not limited to, any polymer suitable for forming blow-molded plastic bottles such as polyethylene terephthalate (PET) and polypropylene. Other suitable polymers include polyethylene naphthalate (PEN), polyethylene isophthalate (PEI), polytrimethylene terephthalate (PTT), and polytrimethylene naphthalate (PTN).

The addition of the salt-containing carbon-metal particle to the polymer composition increases the overall heat capacity of the composition, resulting in the composition softening faster when exposed to a heat source. When the composition is used in a blow molding process, use of the salt-containing carbon-metal particle accordingly leads to faster blow mold cycle rates because it takes less time to achieve the reduced viscosity necessary for the plastic to blown into a bottle.

EXAMPLES

In the following examples, various salt-containing carbon-metal particles according to embodiments of the present invention are prepared (Examples 2-4) and compared to a dispersion of a known carbon black composition (Example 1). In each of Examples 1-4, particle sizes were determined by Dynamic Light Scattering using a Nanotrac Wave from Microtrac with an autocorrelation time of 300 seconds and the thermal conductivity of the mixtures containing either the salt-containing carbon-metal particle or the carbon black is calculated using modulated differential scanning calorimetry (MDSC), which measures heat flow into or out of a material as a function of time. In MDSC, the test specimen is exposed to a linear heating method which has a superimposed sinusoidal oscillation, resulting in a cyclic heating profile. Deconvolution of the resultant experimental heat flow provides not only the total heat flow but also separates that heat flow into reversing and non-reversing components. The MDSC method used to measure the thermal conductivity of the mixtures was validated by measuring polymeric materials of known conductivity and comparing the results to published data. The results are contained in Table 1 below.

TABLE 1

| Sample | Thermal Conductivity, Measured (W m$^{-1}$ ° C.$^{-1}$) | Thermal Conductivity, Literature (W m$^{-1}$ ° C.$^{-1}$) |
| --- | --- | --- |
| Acrylic | 0.2 | 0.2 |
| Polycarbonate | 0.21 | 0.2 |
| Polylactic Acid | 0.12 | 0.14 |
| Polyethylene | 0.3 | 0.27 |

In Example 5, blow-molded PET bottles are fabricated containing carbon black and the salt-containing carbon-metal particle of Example 2 and compared to a blow-molded PET bottle containing no reheat additive and to a sample of unblown PET to measure the heat capacity of the salt-containing carbon-metal particle and to test its suitability as a reheat additive.

Example 1

An aqueous dispersion was prepared including 10 wt. % oxidized carbon black and 0.5 wt. % of polysorbate with a hydrophilic-lipophilic balance (HLB) of 24. The polysorbate is a non-ionic surfactant added to stabilize the dispersion and prevent flocculation of the carbon black particles. The resulting dispersion had a pH of approximately 1.6 and contained carbon black with a primary particle size of 50 nm and a thermal conductivity of 0.655 W m$^{-1}$ ° C.$^{-1}$.

Example 2

0.5 wt. % elemental metallic silver with a primary particle size of 250 nm was suspended in the aqueous dispersion of oxidized carbon black of Example 1. The resulting mixture had a pH of approximately 1.8. The solution was heated to a temperature of 90° C. and subjected to ultrasonication at high intensity and high frequency with an amplitude of 100% at 1200 watts. Ultrasonication of the solution yielded the salt-containing carbon-metal particles with a primary particle size of 356 nm. The resultant material was then filtered, washed, dried, re-suspended in deionized water and sonicated for 15 minutes. The resultant dispersion of the salt-containing carbon-metal particles had a thermal conductivity of 29.9 W m$^{-1}$ ° C.$^{-1}$, measured as described above.

Example 3

A mixture of elemental metallic silver was prepared in a continuous phase of deionized water. Hydrochloric acid to the solution was added to reduce the pH to approximately 2 and dissolve the silver. The aqueous dispersion of oxidized carbon black of Example 1 was added to the silver solution to yield a mixture containing 10 wt. % carbon black and 0.5 wt. % silver. The mixture was heated to a temperature of 90° C. and subjected to ultrasonication at high intensity and high frequency with an amplitude of 100% at 1200 watts. Ultrasonication of the solution yielded the salt-containing carbon-metal particles with a primary particle size of 294 nm. The resultant material was then filtered, washed, dried, re-suspended in deionized water and sonicated for 15 minutes. The resultant dispersion of the salt-containing carbon-metal particles had a thermal conductivity of 83.9 W m$^{-1}$ ° C.$^{-1}$, measured as described above.

In Example 3, ultrasonication resulted in the dissolved silver precipitating out of solution at a nanoparticle size of approximately 6 to approximately 15 nm and chemisorbing to the carbon black particles. Precipitating the metal from the solution led to a finer particle size and structure that promotes better conductivity than Example 2, where the metal was suspended in the mixture instead of being dissolved.

Example 4

A mixture of elemental metallic copper was prepared in a continuous phase of deionized water. Hydrochloric acid to the solution was added to reduce the pH to approximately 2 and dissolve the copper. The aqueous dispersion of oxidized carbon black of Example 1 was added to the copper solution to yield a mixture containing 10 wt. % carbon black and 0.5 wt. % copper. The mixture was heated to a temperature of 90° C. and subjected to ultrasonication at high intensity and high frequency with an amplitude of 100% at 1200 watts. Ultrasonication of the solution yielded the salt-containing carbon-metal particles with a primary particle size of 250 nm. The resultant material was then filtered, washed, dried, re-suspended in deionized water and sonicated for 15 minutes. The resultant dispersion of the salt-containing carbon-metal particles had a thermal conductivity of 103.4 W m$^{-1}$ ° C.$^{-1}$, measured as described above.

As can be seen by comparing the salt-containing carbon-metal particles of Examples 2, 3, and 4, the formation of the salt-containing carbon-metal particle greatly increases the thermal conductivity compared to the carbon black solution of Example 1. A comparison of the salt-containing carbon-metal particles of Examples 3 and 4 indicates that a unique structure is formed as opposed to simply an additive/subtractive effect of the mixture because metallic silver has a higher thermal conductivity than metallic copper (429 W m$^{-1}$ ° C.$^{1}$ vs 401 W m$^{-1}$ ° C.$^{-1}$) but the copper-carbon particle of Example 4 has a higher thermal conductivity than the silver-carbon particle of Example 3 (103.4 W m$^{-1}$° C.$^{-1}$ vs 83.9 W m$^{-1}$ ° C.$^{1}$).

Example 5

Blow-molded PET bottles were fabricated containing carbon black and the salt-containing carbon-metal particle of Example 2 and compared to a blow-molded PET bottle containing no reheat additive and to a sample of unblown PET to measure the heat capacity of the salt-containing carbon-metal particle and to test its suitability as a reheat additive. The concentration of the carbon black and the salt-containing carbon-metal particle was 50 ppm. Commercially available PET is known to have a carbon content of approximately 50 ppm before the addition of any additives, but the actual carbon content of the PET used in Example 5 is unknown. 2 inch by 3 inch by 30 mm plaques were prepared of unblown PET with no additive, blow molded PET with no additives, blow molded PET with 50 ppm of the high-acidity carbon black used in Examples 2, 3, and 4, and blow molded PET with 50 ppm of the salt-containing carbon-metal particle. The samples were prepared on an injection molder.

Each plaque was heated by a 250 Joule/second quartz lamp at a distance of 6 inches, and the temperature of the plaque was measured using a surface probe pyrometer at 30 seconds and at 60 seconds. The results are displayed below in Table 2. Table 2 also includes the calculated heat capacity of each sample according to $\Delta Q = m * C_p * \Delta T$, where $\Delta Q$ is the heat applied to the plaque, m is the mass of the plaque, $C_p$ is the heat capacity of the plaque, and $\Delta T$ is the change in temperature resulting from the applied heat. The mass of each sample varied due density differences caused by the addition of the different additives and differences in handling.

TABLE 2

| Sample | Temp. at 30 s (° C.) | Temp. at 30 s (° C.) | Cp (J g$^{-1}$ ° C.$^{-1}$) |
|---|---|---|---|
| Unblown PET | 98 | 122 | 0.531 |
| Blow molded PET | 83 | 102 | 0.8544 |
| Carbon Black | 79 | 89 | 1.0279 |
| Carbon-metal Particle | 58 | 81 | 1.1748 |

As can be seen from Table 2, the salt-containing carbon-metal particle of Example 1 increases the heat capacity of the blow-molded PET to a greater degree than carbon black and therefore the PET including the salt-containing carbon-metal particle will soften faster than PET containing no additive or containing carbon black and lead to faster blow mold cycle rates.

The foregoing description of preferred embodiments of the invention should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed:

1. A method of improving heat dissipation of a plastic component, the method comprising:
    adding to the plastic an additive including a salt-containing carbon-metal particle,
    wherein the salt-containing carbon-metal particle comprises acidic carbon black having a reactive surface and a metal, wherein at least a portion of the metal forms an ionic bond with the reactive surface of the acidic carbon black, and wherein
    the carbon-metal salt additive increases the heat capacity of the plastic.

2. The method of claim 1, wherein the metal is selected from the group consisting of zinc, aluminum, gold, iron, lead, silver and copper.

3. The method of claim 1, wherein the salt-containing carbon-metal particle is added to the plastic in a concentration ranging from approximately 0.01 wt. % to approximately 5.0 wt. %.

4. The method of claim 1, wherein the plastic is suitable for fabricating into bottles.

5. The method of claim 1, wherein the plastic is suitable for fabricating into covers for automotive headlights.

6. The method of claim 1 wherein the salt-containing carbon-metal particle is prepared by:
    forming an aqueous mixture of acidic carbon black and one or more metals by dissolving a metal in a zero oxidation state in an acidic aqueous solution, preparing an aqueous dispersion of the acidic carbon black, and adding the aqueous dispersion of the acidic carbon black to the acidic aqueous solution of the dissolved metal; and
    applying energy to the aqueous mixture, whereby applying energy to the aqueous mixture results in at least a portion of the metal forming an ionic bond with the reactive surface of the acidic carbon black.

* * * * *